United States Patent
Dhoolia et al.

(10) Patent No.: US 8,769,516 B2
(45) Date of Patent: Jul. 1, 2014

(54) SYSTEMS AND METHODS FOR AUTOMATED SUPPORT FOR REPAIRING INPUT MODEL ERRORS

(75) Inventors: Pankaj Dhoolia, Uttar Pradesh (IN); Senthil Kumar Kumarasamy Mani, Haryana (IN); Saurabh Sinha, New Delhi (IN); Vibha Singhal Sinha, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 12/859,678

(22) Filed: Aug. 19, 2010

(65) Prior Publication Data

US 2012/0047391 A1  Feb. 23, 2012

(51) Int. Cl.
*G06F 9/45* (2006.01)
(52) U.S. Cl.
USPC .............................. 717/154; 717/124; 714/25
(58) Field of Classification Search
None
See application file for complete search history.

(56) References Cited

U.S. PATENT DOCUMENTS

| 5,463,768 | A | * | 10/1995 | Cuddihy et al. | 714/37 |
|---|---|---|---|---|---|
| 5,629,846 | A | * | 5/1997 | Crapo | 708/705 |
| 5,719,881 | A | * | 2/1998 | Yonetoku | 714/25 |
| 6,343,236 | B1 | | 1/2002 | Gibson et al. | |
| 6,622,264 | B1 | | 9/2003 | Bliley et al. | |
| 6,983,317 | B1 | * | 1/2006 | Bishop et al. | 709/223 |
| 7,058,860 | B2 | | 6/2006 | Miller et al. | |
| 7,185,088 | B1 | * | 2/2007 | Joy et al. | 709/224 |
| 7,788,235 | B1 | * | 8/2010 | Yeo | 707/687 |
| 7,890,923 | B2 | * | 2/2011 | Elaasar | 717/104 |
| 8,042,091 | B2 | * | 10/2011 | Koehler et al. | 717/104 |
| 8,126,693 | B2 | * | 2/2012 | Arnold et al. | 703/13 |
| 2004/0002994 | A1 | * | 1/2004 | Brill et al. | 707/104.1 |
| 2005/0149811 | A1 | * | 7/2005 | Lubow | 714/746 |
| 2005/0171661 | A1 | * | 8/2005 | Abdel-Malek et al. | 701/33 |
| 2005/0210017 | A1 | * | 9/2005 | Cucerzan | 707/3 |
| 2006/0195745 | A1 | * | 8/2006 | Keromytis et al. | 714/741 |
| 2007/0198312 | A1 | * | 8/2007 | Bagchi et al. | 705/7 |
| 2007/0239769 | A1 | * | 10/2007 | Fazal et al. | 707/102 |
| 2008/0140705 | A1 | * | 6/2008 | Luo | 707/103 R |
| 2008/0216175 | A1 | * | 9/2008 | Pike | 726/22 |
| 2008/0229276 | A1 | * | 9/2008 | Koehler et al. | 717/104 |
| 2008/0313008 | A1 | * | 12/2008 | Lee et al. | 705/10 |
| 2009/0013208 | A1 | * | 1/2009 | DiMuzio | 714/2 |
| 2009/0125976 | A1 | * | 5/2009 | Wassermann et al. | 726/1 |

(Continued)

OTHER PUBLICATIONS

Mazzini et al. (Mazzini, Silvia; Latella, Deigo; Viva, Daniela; "Pride: An Integrated Software Development Environment for Dependable Systems" Proceedings of the DASIA 2004 Conference; Jun. 28-Jul. 1, 2004, Nice, France (ESA SP-570, Aug. 2004).*

(Continued)

*Primary Examiner* — Gurkanwaljit Singh
*Assistant Examiner* — Alan S Miller
(74) *Attorney, Agent, or Firm* — Ference & Associates LLC

(57) ABSTRACT

Systems and associated methods for automated repair support for input model faults are described. Embodiments automate generation of fault repair support by producing one or more repair action suggestions for a given input model containing faults. Responsive to an indication of one or more faults within the model, embodiments utilize a fault index to ascertain the nature of faults within the model and to compile one or more repair action suggestions. Users can review the repair action suggestions, and preview the impact each of these suggestions will have on the model if implemented, and select an appropriate repair action for repairing a model containing faults.

20 Claims, 15 Drawing Sheets

(56) References Cited

U.S. PATENT DOCUMENTS

| | | | |
|---|---|---|---|
| 2009/0150860 A1* | 6/2009 | Gschwind et al. | 717/104 |
| 2009/0172644 A1* | 7/2009 | Nagarajan et al. | 717/128 |
| 2009/0183028 A1* | 7/2009 | Arnold et al. | 714/16 |
| 2009/0288070 A1* | 11/2009 | Cohen et al. | 717/125 |
| 2009/0327844 A1* | 12/2009 | Suneya | 714/776 |
| 2010/0011338 A1* | 1/2010 | Lewis | 717/105 |
| 2010/0185644 A1* | 7/2010 | Gutt et al. | 707/759 |
| 2010/0198799 A1* | 8/2010 | Krishnan et al. | 707/702 |
| 2011/0252475 A1* | 10/2011 | Mui et al. | 726/23 |
| 2011/0314331 A1* | 12/2011 | Beach et al. | 714/26 |
| 2011/0314337 A1* | 12/2011 | Sinha et al. | 714/37 |

OTHER PUBLICATIONS

Newsome et al., "Dynamic Taint Analysis for Automatic Detection, Analysis, and Signature Generation of Exploits on Commodity Software," May 2004.*

Xu et al., "Taint-Enhanced Policy Enforcement: A Practical Approach to Defeat a Wide Range of Attacks," 15th USENIX Security Symposium, 2006.*

Dhoolia, Pankaj, et al. "Debugging model-transformation failures using dynamic tainting." ECOOP 2010-Object-Oriented Programming. Springer Berlin Heidelberg, 2010. 26-51.*

Frank, Paul M. "Fault diagnosis in dynamic systems using analytical and knowledge-based redundancy: A survey and some new results." Automatica 26.3 (1990): 459-474.*

Nanda, Mangala Gowri, et al., "Demystifying Model Transformations: An Approach Based on Automated Rule Inference", OOPSLA 2009, Oct. 25-29, 2009, Orlando, Florida.

Ebnenasir, Ali, and Cheng, Betty H.C., "Pattern-Based Modeling and Analysis of Failsafe Fault-Tolerance in UML", available at http://citeseerx.ist.psu.edu/viewdoc/download?doi=10.1.1.133.7782&rep=rep1&type=pdf.

Miguel, M.A. De, et al, "Integration of safety analysis in model-driven software development", available at http //oa.upm.es/2837/3/INVE_MEM_2008_59350.pdf.

Slatten, Vidar, "Model-Driven Engineering of Dependable Systems", 2010 Third International Conference on Software Testing, Verification and Validation, available at http://ieeexplore.ieee.org/stamp/stamp.jsp?arnumber=5477064.

Egyed, Alexander et al., "Generating and Evaluating Choices for Fixing Inconsistencies in UML Design Models," ASE 2008, 23rd IEEE/ACM International Conference on Automated Software Engineering, Sep. 15-19, 2008, pp. 99-108, IEEE Digital Library.

Xiong, Yingfei et al., "Supporting Automatic Model Inconsistency Fixing," ESEC-FSE '09, Amsterdam, The Netherlands, Aug. 24-28, 2009, pp. 315-324, ACM Digital Library.

Demsky, Brian et al., "Automatic Detection and Repair of Errors in Data Structures," OOPSLA '03, Anaheim, California, USA, Oct. 26-30, 2003, pp. 78-95, ACM Digital Library.

Elkarablieh, Bassem et al., "Assertion-based Repair of Complex Data Structures," ASE '07, Atlanta, Georgia, USA, Nov. 5-9, 2007, pp. 64-73, ACM Digital Library.

Egyed, Alexander, "Fixing Inconsistencies in UML Design Models," ICSE '07, 29th International Conference on Software Engineering, May 20-26, 2007, pp. 292-301 (10 pages), IEEE Digital Library.

* cited by examiner

```
1  <xsl:template match="userData">
2    <xsl:for-each select="./user">
3      <xsl:text>---- User ----</xsl:text>
4      <xsl:call-template name="printUserName">
5        <xsl:with-param name="node" select="."/>
6      </xsl:call-template>
7      <xsl:if test="./family">
8        <xsl:text>---- Spouse Details ----</xsl:text>
9        <xsl:choose>
10         <xsl:when test="@gender='F'">
11           <xsl:for-each select=
12  "./family/user/relationship[@type='husband']">
13             <xsl:text>Husband's name: </xsl:text>
14             <xsl:call-template name="printUserName">
15               <xsl:with-param name="node"
    select="./parent::user"/>
16             </xsl:call-template>
17           </xsl:for-each>
18         </xsl:when>
19         <xsl:when test="@gender='M'">
20           <xsl:for-each select=
21  "./family/user/relationship[@type='wife']">
22             <xsl:text>Wife's name: </xsl:text>
23             <xsl:call-template name="printUserName">
24               <xsl:with-param name="node"
    select="./parent::user"/>
25             </xsl:call-template>
26           </xsl:for-each>
27         </xsl:when>
28         <xsl:otherwise></xsl:otherwise>
29       </xsl:choose>
30       <xsl:text>---- Dependant Details ----</xsl:text>
31       <xsl:for-each select=
32  "./family/user/relationship[@type='dependent']">
33         <xsl:call-template name="printUserName">
34           <xsl:with-param name="node"
    select="./parent::user"/>
```

FIG. 2A

```
35  </xsl:call-template>
36         <xsl:value-of select="./parent::user/@gender"/>
37         <xsl:text>, </xsl:text><xsl:value-of select="@age"/>
38      </xsl:for-each>
39    </xsl:if>
40  </xsl:for-each>
41 </xsl:template>
42
43 <xsl:template name="printUserName">
44   <xsl:param name="node"/>
45   <xsl:value-of select="$node/@first"/>
46   <xsl:text> </xsl:text>
47   <xsl:if test="$node/@hasMiddle='true'">
48      <xsl:value-of select="$node/@middle"/>
49      <xsl:text> </xsl:text>
50   </xsl:if>
51   <xsl:value-of select="$node/@last"/>
52 </xsl:template>
```

FIG. 2B

```
1  <userData tag="1">
2  <user tag="1.2" first="Jane" last="Doe"
3     hasMiddle="true" middle="P." gender="F">
4     <family tag="1.2.2">
5        <user tag="1.2.2.2" first="Alan"
6           last="Doe" hasMiddle="true" middle="E.">
7           <relationship tag="1.2.2.2.2" type="husband"/>
8        </user>
9        <user tag="1.2.2.4" first="Tim"
10          last="Doe" hasMiddle="false" gender="M">
11          <relationship tag="1.2.2.4.2"
12             type="dependent" age="2 yrs"/>
13       </user>
14    </family>
15 </user>
16 <user tag="1.4" first="Amit" last= "Doe2"
17    gender="M">
18    <family tag="1.4.2">
19       <user tag="1.4.2.2" first="Sonali"
20          last="Doe2">
21          <relationship tag="1.4.2.2.2"/>
22       </user>
23    </family>
24 </user>
25 </userData>
```

F1: missing attributes has Middle and middle

F3: missing element user (dependent)

F2: missing attribute type

FIG. 2C

```
19    <xsl:when test="@gender='M'">
20      <xsl:for-each select=
21      "./family/user/relationship[@type='wife']">
22        <xsl:text>Wife's name: </xsl:text>
23        <xsl:call-template name="printUserName">
24          <xsl:with-param name="node" select="./parent::user"/>
25        </xsl:call-template>
26      </xsl:for-each>
```

```
<control>
<condition leftNode="1.4.gender" lvalue="M"
    op="EQ" rValue="M" />
<get xpath="@gender" startNode="1.4" />
<control>
<loop>
<get xpath="family/user/relationship
    /@type=wife" startNode="1.4" />
<next/>
<control/>
</loop>
</control>
</control>
```

```
 1  <taintlog>
 2  <loop>
 3  <get xpath="/user" startNode+"1"/>
 4  <next node="1.2" />
 5  <control>
 6  ....
 7  <control>
 8  ---- Dependant Details ----
 9  <loop>
10  <get xpath="/family/user/relationship
11                /@type=dependent" startNode="1.2"/>
12  <next node="1.2.4.2"/>
13  <control>
14  ....
15  <get xpath="@first" startNode="1.2.2.4"/>
16  <next node="1.2.2.4.@first" ../>
17  <data>Tim</data>
18  ...
19  </control>
20  <next node="-1" />
21  <control/>
22  </loop>
23  </control>
24  <next node="1.4"/>
25  <control>
26  ....
27  <control>
28  ---- Dependant Details ----
29  <loop>
30  <get xpath="/family/user/relationship
31                /@type=dependent" startNode="1.4"/>
32  <next node="-1"/>
33  <control/>
34  </loop>
35  </control>
36  </control>
37  </loop>
38  </taintlog>
```

520C

510C

FIG. 5C process ComputeRepairActions
input    $L$    Taint log
          $t$    Taint mark in $L$
output $R$    Fix recommendation for $t$ begin
1.   if $t$ is a data taint then
2.      if $t$'s preceding element $e=$<next>$\wedge \exists e$.node then
3.         add [SET $e$.node TO *] to $R$
4.      else find prededing <get> element $e$ // access of missing entity
5.         add [ADD $e$.xpath TO $e$.startNode] to $R$
6.         add [SET $e$.xpath TO *] to $R$
7.   else if $t$ is a control taint then
8.      if $t$'s preceding element $e_1 =$ <next> then // missing loop iteration
9.         find $e_1$'s preceding <get> element $e_2$
10.      add [ADD $e_2$.xpath TO $e_2$.startNode] to $R$
11.   else if $t$'s preceding element $e_1 =$<condition> then
12.      if $\exists e_1$.leftNode $\wedge \exists e_1$.rvalue then
13.         add [SET $e_1$.leftNode TO $(e_1.\text{rvalue} \mid \neg e_1.\text{rvalue})$] to $R$
14.      else if $\nexists e_1$.leftNode $\wedge \exists e_1$.rvalue then
15.         find $e_1$'s preceding <get> element $e_2$
16.         add [ADD $e_2$.xpath TO $e_2$.startNode] to $R$
17.         add [SET $e_2$.xpath TO $(e_1.\text{rvalue} \mid \neg e_1.\text{rvalue})$] to $R$
end

FIG. 7

SYSTEMS AND METHODS FOR AUTOMATED SUPPORT FOR REPAIRING INPUT MODEL ERRORS

BACKGROUND

Model-Driven Engineering (MDE) is the paradigm of software development that uses formal models, at different abstraction levels, to represent the system under development, and uses automated transforms to convert one model to another model or text. Model transforms are a class of applications (functions or programs) that convert a model to another model or text. A transformation is the application, or the execution, of a transform on a model instance.

A significant class of model transforms, called model-to-text transforms, generate text output (for example, code, configuration files, or HTML/JSP files) from an input model (for example, XML or UML). The inputs to the transforms are often large and complex, containing tens of thousands of elements. Therefore, faults in an input model that cause a transformation to fail by generating an incorrect output can be difficult to identify and fix.

Although model-transformation failures can be caused by faults in the transform, failures that are caused by faults in the input models also often occur. This is particularly relevant in MDE, where it is a common practice for transform users to use transforms that are not written by them, for example, using standard, built-in transforms provided by a tool.

BRIEF SUMMARY

The subject matter described herein generally relates to systems and associated methods for automated repair support for input model errors (faults). Embodiments automate generation of fault repair support by producing one or more repair action suggestions for a given input model containing faults. Responsive to an indication of one or more faults within the model, such as identified by a user upon reviewing the output of a model transformation, embodiments utilize a fault index created by leveraging embedded markers to ascertain the nature of faults within the model and to compile one or more repair action suggestions. Users can review the repair action suggestions, preview the impact each of these suggestions will have on the model if implemented, and select an appropriate repair action for repairing a model containing faults.

In summary, one aspect provides a method for automated repair support for input model errors comprising: accessing an input model; transforming the input model to produce an output; accessing input indicating one or more errors within the output; creating a fault index for the one or more errors; using the fault index to compile one or more repair action suggestions to repair the one or more errors; and outputting the one or more repair action suggestions Another aspect provides a computer program product for automated repair support for input model faults comprising: a computer readable storage medium having computer readable program code embodied therewith, the computer readable program code comprising: computer readable program code configured to access an input model; computer readable program code configured to transform the input model to produce an output; computer readable program code configured to access input indicating one or more errors within the output; computer readable program code configured to create a fault index for the one or more errors; computer readable program code configured to use the fault index to compile one or more repair action suggestions to repair the one or more errors; and computer readable program code configured to output the one or more repair action suggestions.

A further aspect provides a system for automated repair support for input model faults comprising: one or more processors; and a memory operatively connected to the one or more processors; wherein, responsive to execution of computer readable program code accessible to the one or more processors, the one or more processors are configured to: access an input model; transform the input model to produce an output; access input indicating one or more errors within the output; create a fault index for the one or more errors; use the fault index to compile one or more repair action suggestions to repair the one or more errors; and output the one or more repair action suggestions.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 2(A-B) illustrates an example XSL model transform.

FIG. 2C illustrates an example of a failure inducing input from a model.

FIG. 5A-C illustrates examples of fault repairs for example faults.

FIG. 7 illustrates an example process for computing repair actions.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

Failures that are caused by faults in the input models often occur. This is particularly relevant in MDE, where it is a common practice for transform users to use transforms that are not written by them, for example, using standard, built-in transforms provided by a tool. Therefore, when an execution of such a transform fails, the pertinent task for the user is to locate and fix faults in the failure-inducing input models; investigating the transform code is irrelevant from the user's perspective, as this is likely not the source of the error.

In providing fixes for faults in input models, a first step is correct fault localization. An example of a system for fault localization is described in co-pending and commonly assigned U.S. patent application Ser. No. 12/184,439, entitled: "Method and Apparatus for Locating Input-Model Faults Using Dynamic Tainting", incorporated by reference here. For ease of description, example fault localization techniques are also described herein, with specific emphasis on portions used by embodiments to provide automatic fault repair.

The description now turns to the figures. The illustrated example embodiments will be best understood by reference to the figures. The following description is intended only by way of example and simply illustrates certain selected example embodiments representative of the invention, as claimed.

Figure 1:
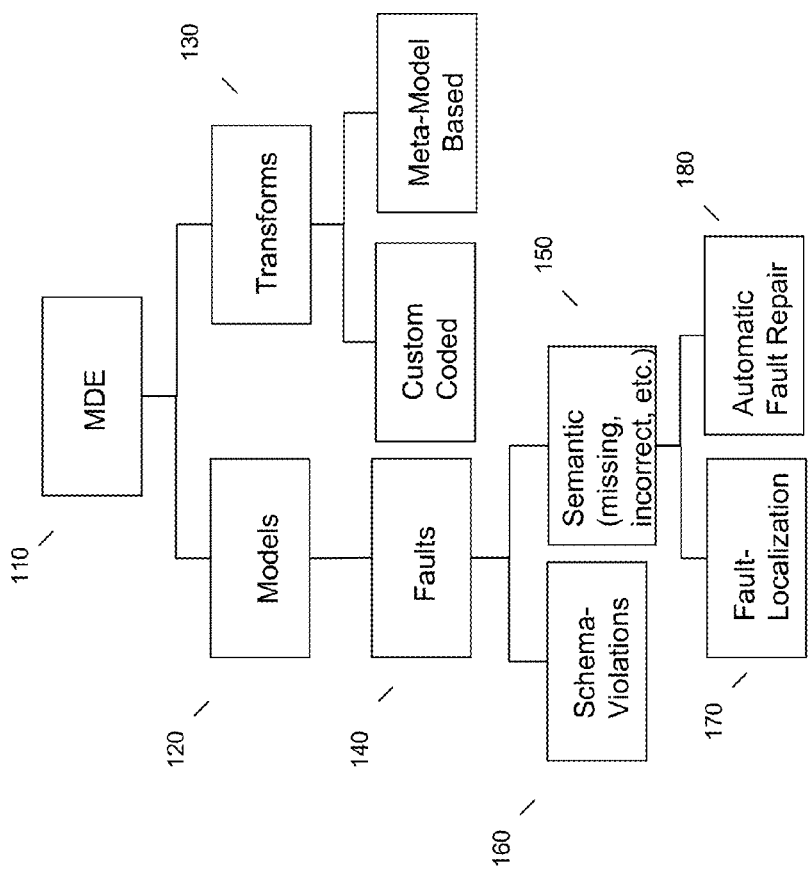
FIG. 1 illustrates an overview of model driven engineering and fault repair.

Referring to FIG. 1, a high level overview of MDE, fault localization, and fault repair is illustrated. As shown, MDE 110 includes transforming models 120 with a set of transforms 130 to produce output. However, faults 140 are often encountered in the model design that create errors in the output. The faults 140 can be broadly categorized into two varieties, schema violations 160 and semantic violations 150 (for example, missing or incorrect values). Repair of schema violations 160 is comparatively straight forward as compared to repair of semantic violations 150, and schema violations 160 are not specifically addressed in detail herein.

Using a fault localization method 170, faults in the input model can be identified. Fault localization 170 is only the first step in debugging an input model 120; the next step is fault repair 180: fixing the fault(s) 140 so that the execution of the transform 130 on the fixed model 120 generates the correct output. Although fault localization 170 may identify the problematic parts of the input model 120 with high accuracy, fixing the faults 140 is often very complex.

To illustrate, consider a case in which an input-model attribute isGen determines the outcome of a conditional statement in the transform. An incorrect value of isGen causes a wrong path to be taken and, consequently, an incorrect output to be generated. Even though isGen may be identified precisely during fault localization, fixing the value of isGen may be quite complicated. This is especially true when the user has no access to the transform code, which, as mentioned, is often the case. Thus, in addition to fault localization 170, a technique for supporting fault repair 180 is important for developing efficient model debugging.

Existing work on fault repair for models considers only those faults that violate consistency constraints; such faults can be detected using consistency checkers. However, in the context of automated transforms, a large class of faults may violate no (model or transform) constraints, and yet cause a transformation failure. Such faults cannot be detected using automated checkers; therefore, no support for fault repair can be provided.

To extend work on fault localization and address these limitations, embodiments employ techniques to support fault repair, that is, the fixing of the input-model faults. Embodiments employ an approach for fault repair that collects runtime information for the failing transformation, and uses the information to compute repair actions to be performed on the failure-inducing input model. For example, a repair action could suggest the addition of an element to the model, or a change in the value of a model attribute.

Defined herein are different types of runtime information (or metadata) about the failing transformation that needs to be collected to enable the computation of accurate repair actions. The metadata contains information about conditional statements, looping constructs, and how input-model elements and attributes are accessed during the transformation. For example, for a conditional statement, embodiments capture information about the comparison made on an input model element: the model element that is compared, the comparison operator, and the value compared with. To collect the runtime information, example embodiments are described that leverage and extend the dynamic-taint analysis developed for example in co-pending and commonly assigned U.S. patent application Ser. No. 12/184,439.

Generally, two techniques are presented herein that leverage the metadata to compute repair actions. The first technique, fault-index analysis, computes repair actions that are targeted toward fixing the immediate cause of the failure. This initial set of repair actions can, in many cases, fix the fault completely so that the transform generates the correct output on the repaired input model. However, in other cases, the application of the repair actions may not generate the correct output because the input model requires further repairs.

To address this, rather than iterating the first technique, embodiments can utilize a second technique, which performs pattern analysis on the output of the failing transformation to find instances of correct output string fragments that are similar to the incorrect output string fragment. The intuitive idea underlying this technique is that by analyzing correct samples of similar output fragments, appropriate repair actions can be computed. For instance, the correct samples can highlight omissions (missing elements and attributes) that need to be added to the input model. In addition to finding similar fragments in the output of the failing transformation, pattern analysis can be performed on the output generated from exemplar input models.

Example embodiments are also described which implemented a fault-repair approach for XSL-based transforms that convert input models to text (Java code, properties files, and configuration files). Using the implementation, empirical studies on a set of real transforms were conducted to evaluate the usefulness of such an approach. Results indicate that, for the subjects considered, different types of metadata are necessary to enable the computation of accurate repair actions. Moreover, the fault-index-based repair actions suffice for completely fixing many types of faults. For the types of faults for which the initial repair actions are insufficient, the pattern-analysis technique computed meaningful repair actions in each instance.

To illustrate the problem, and discuss tainting-based fault-localization techniques, the following example is utilized.

As briefly mentioned above, model-to-text (M2T) transforms are a class of applications that transform input models to text files. Examples of such transforms include UML-to-Java code generators and XML-to-HTML converters. An M2T transform can be implemented using a general-purpose programming language, such as Java. Such a transform reads content from input files, performs the transformation logic, and writes strings to output files. Alternatively, a transform can be implemented using specialized templating languages, such as XSLT (eXtensible Stylesheet Language Transformation), that lets developers code the transform logic as a template. The associated Xalan library provides the functionality to read the input and write the output to a text file.

FIG. 2A presents PrintUser, an example M2T transform written in XSLT. The transform takes as input an XML file containing user information and prints the information in a plain-text format. The XML shown in FIG. 2C of the figure illustrates a sample input to the transform. The input model contains two <user> elements (lines 2-15 and 16-24), each of which has a <family> element. Each <family> element, in turn, contains a list of <user> elements that specify the spouse and dependents of the containing <user> element.

As illustrated, a <user> element can have five attributes: first, last, hasMiddle, middle, and gender. A <user> element also has a <relationship> element contained within it. Each element has a unique node ID, specified as the tag attribute, which is added to identify input-model elements.

PrintUser iterates over the top-level <user> elements using the XSL for-each construct (line 2). Within the loop, it first calls function printUserName (shown in lines 44-52) to print the user name (lines 4-6). Then, it processes <family> elements (lines 7-40): it prints spouse details (lines 8-29) and dependent details (lines 30-39). To print the spouse information, the transform uses the choose construct at line 9 to test the gender attribute of <user> (lines 10, 19). If the value of gender is F, the transform selects the contained <user> element whose <relationship> sub-element has type attribute with value husband (line 11) and prints the husband's name (lines 13-16). Lines 20-26 perform a similar processing for the case where the value of gender is M.

Figure 2D:
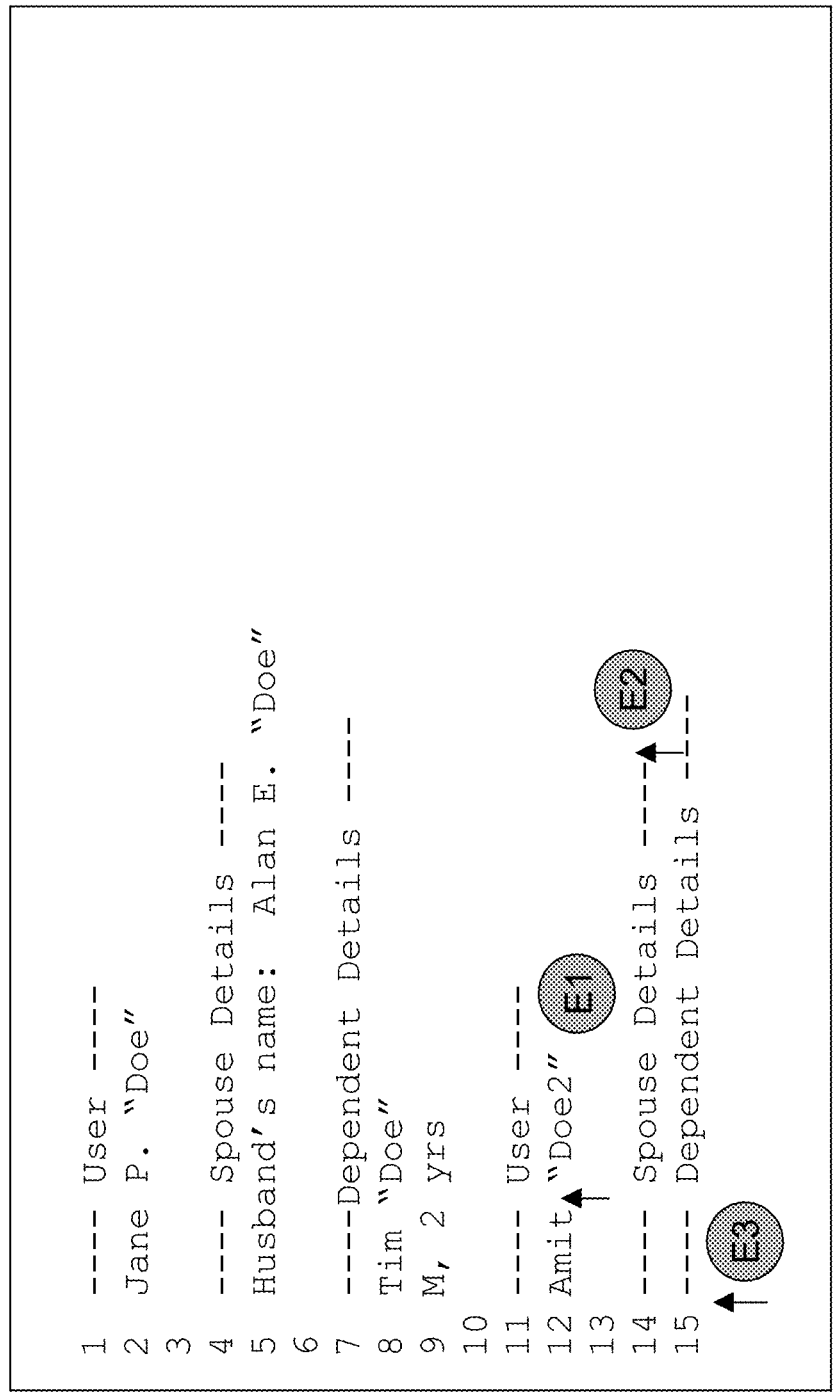
FIG. 2D illustrates an example of incorrect output from a model transform.

The output of the transform on the sample input is shown in FIG. 2D. Lines 1-9 of the output correspond to the data printed for the first <user> element (lines 2-15 of the input). Transform lines 3-6 print output lines 1-2; transform lines 13-16 print output line 5; and transform lines 30-39 print output lines 7-9.

The input model contains three faults that cause incorrect output to be generated. The incorrect parts of the output, which have missing substrings, are highlighted in the output as E1, E2, and E3. E1 illustrates a missing middle name on output line 12. This occurs because of a fault in line 17 of the input: the <user> element is missing attributes hasMiddle and middle. E2 highlights missing text for the spouse name, which occurs because of the fault in input line 21, where element <relationship> is missing attribute type. Finally, E3 highlights missing dependent details; this occurs because element <family> in input line 18 is missing an entire <user> sub-element.

A first step in providing automated repair of such faults is to identify their location using a fault localization technique. In co-pending and commonly assigned U.S. patent application Ser. No. 12/184,439 is presented an example of a dynamic-tainting-based approach that can assist in locating such input-model faults. The goal of embodiments described herein is to assist with locating and fixing input-model faults (and not transform faults). Therefore, for the purposes of this description, it can be assumed that the transform is correct. Moreover, it can be assumed that the input model satisfies all consistency constraints imposed by the metamodel or required by the transform.

Embodiments employ a fault-localization approach that associates taint marks with input-model elements and adds probes to the transform that propagate the taint marks to the output string. A feature of the approach utilized by embodiments is that the approach distinguishes different types of taint marks: data taints, control taints, and loop taints, which are propagated at different transform statements. A data taint is propagated at assignments and statements that directly, or indirectly, construct the output string. A control taint is propagated at conditional statements to the parts of the output that are constructed along the branches of the conditional. A loop taint is propagated at looping constructs to the output strings that are constructed within the loops. The taint marks associated with substrings of the output are used to construct a fault space, which the user can examine incrementally to locate the fault.

Figure 3:
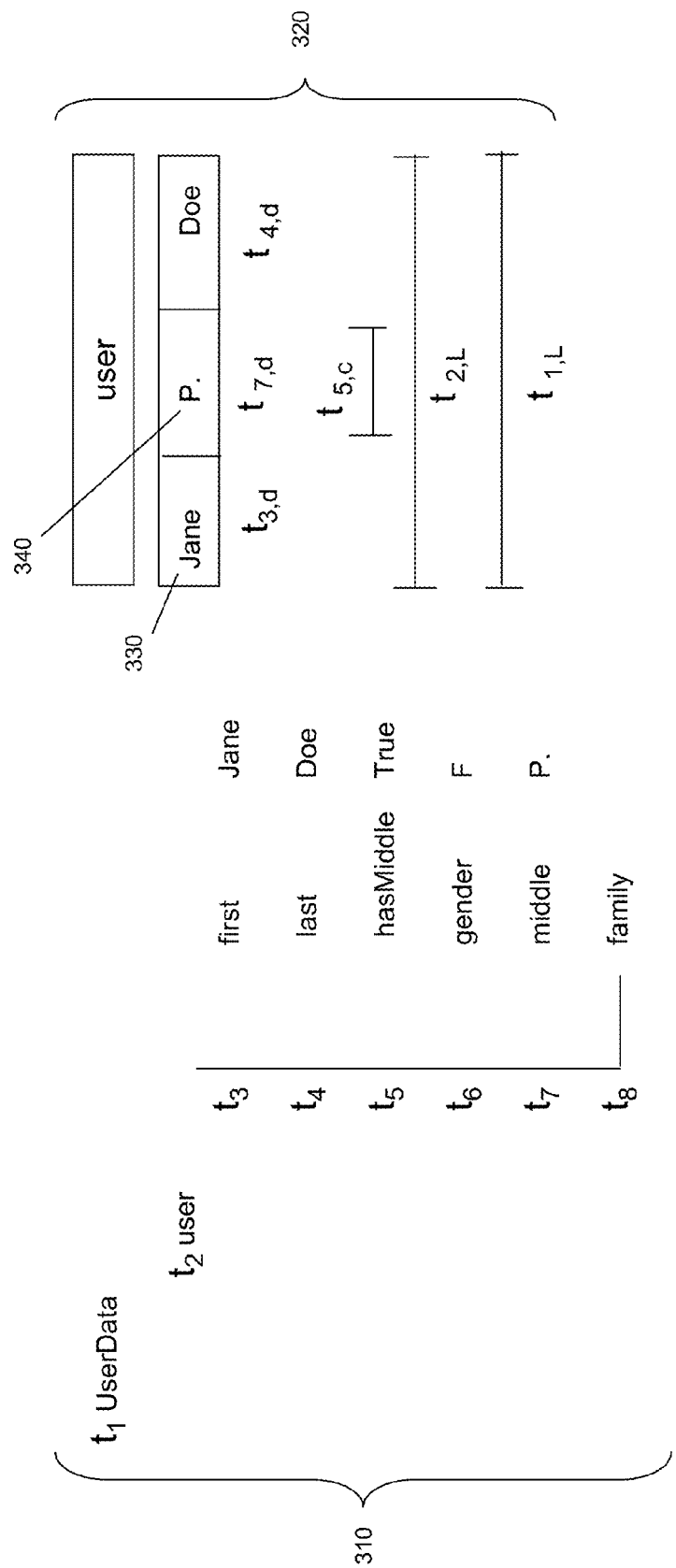
FIG. 3 illustrates an example view of a taint log.

To illustrate, consider a smaller fragment of the input model, shown in a tree form 310 in FIG. 3. The model elements (for example "user") and attributes (for example "Jane") have taint marks, labeled $t_1$ to $t_8$ associated with them. During the execution of the transform, these taint marks $t_1$ to $t_8$ are propagated to the output string to generate a taint log 320. The right side of FIG. 3 shows an intuitive representation of the taint log 320. The intuitive representation of the taint log 320 is an abstract representation of a taint log. According to example embodiments, the actual taint log is an XML file in which different elements, and their nesting structure, capture the taint information (examples of taint logs are further described herein).

Different substrings in the output have data, control, and loop taints associated with them. For example, the output string "Jane" 330 has data taint $t_{3,d}$ associated with it because the string is constructed from the input-model attribute first, which was initialized with taint $t_3$. For another example, the output string "P." 340 is generated under a condition (line 47 of PrintUser) whose outcome is determined by attribute hasMiddle, which was initialized with taint $t_5$; therefore, $t_5$ is propagated to "P." 340 as control taint $t_{5,c}$. A data or a control taint can be empty that is, it may enclose no string. This occurs when an input-model attribute is empty or no string is generated along the taken-branch of a conditional whose outcome is determined by an input-model attribute.

Given a taint log and an error marker (that is, a location in the output text where a missing or incorrect string occurs) identified by the user, a fault-localization technique identifies enclosing taints, in reverse order of nesting, and constructs the fault space incrementally. To illustrate, for failure E1 (FIG. 2D), line 47 of PrintUser (FIG. 2(A-B)) attempts to access attribute hasMiddle for the second user. Because this attribute does not exist, no control-taint information is generated for the access. Starting at the error marker, a fault-localization technique utilized by embodiments searches for the enclosing control taints. It would identify the control taint that was propagated at line 2: the loop that lexically encloses line 47 via the call in line 4. Thus, the fault would be localized to the second <user> element in the input model.

Although a fault-localization technique is able to localize such faults effectively, it provides little if any guidance on how the fault should be fixed. Thus, embodiments provide techniques that enable automated support for repairing such input-model faults.

A basic goal of embodiments for fault repair is to offer recommendations to the user on how to fix a faulty input model that causes a transformation failure. A fix recommendation R consists of a set of repair actions on a faulty input model. A repair action r on an input model is a unit change to be made to the model. A repair action can be defined as follows:

| | | |
|---|---|---|
| r | ::= | ADD attr to elem$_t$ \| |
| | | ADD elem to elem$_t$ \| |
| | | SET attr to (value \|¬value\|*) |

The first action adds an attribute with an arbitrary, possibly empty, value to an element. The second action adds an element to another element. The final action sets an attribute to the specified value, any value other than the specified value, or to an arbitrary value (indicated by '*'). The term elem is an element name, whereas elem$_t$ can be an element name (for a newly added element by a repair action) or a node ID (for an existing element in the model).

Figure 4:
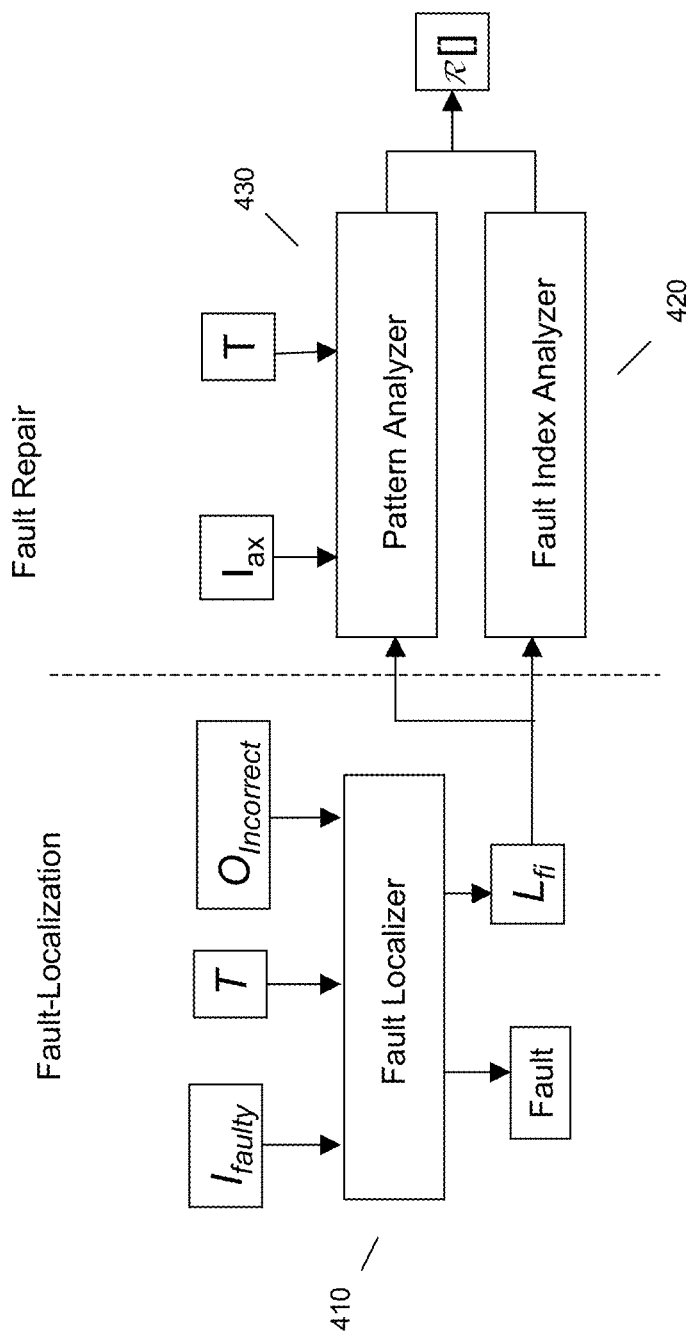
FIG. 4 illustrates an example approach for fault index analysis and pattern analysis.

FIG. 4 presents an overall approach for debugging input-model faults. The approach includes both fault localization and fault repair. Given a transform program T and a failure-inducing input model $I_{faulty}$ for which T generates an incorrect output, fault localization assists in identifying the input-model fault. Given a user-provided error marker and the taint log for the failing transformation, the fault localizer 410 computes the fault space and the fault index $L_{fi}$ in the taint log: the relevant taint mark for a given error marker.

To compute repair actions, an extension of the taint-propagation mechanism described above has been created to collect additional information (or metadata) about the failing transformation. Embodiments employing the fault-repair approach take as input the fault index in the taint log and compute a set of alternative recommendations $\mathcal{R}$. A fault index analyzer 420 and/or a pattern analyzer 430 establish the set of alternative recommendations. The user can select a recommendation R∈$\mathcal{R}$ and apply the repair actions in R to the faulty input.

For fault localization, information/metadata about the flow of input data to output text in the failing transformation is sufficient. However, to support fault repair, extra information/metadata that indicates how the input data was used to create the output is utilized. This additional metadata essentially allows embodiments to recreate, to some degree, the transform logic. Embodiments employ an approach that collects three types of metadata for the failing transformation: (1) accesses of input-model entities, (2) conditional statements, and (3) selection of model elements from a collection.

Metadata about Entity Access.

Embodiments collect metadata about transform statements that, directly or indirectly, attempt to access input-model entities (elements or attributes). For entities that exist in the input model, this information is naturally captured via taint propagation. However, for a missing entity, no taint initialization occurs; therefore, no taint propagation is performed even though the transform attempts to access the attribute. To handle such cases, embodiments augment the transform instrumentation to collect runtime information about accesses to input-model entities, irrespective of whether the access succeeds.

The metadata is captured in a <get> element in the taint log. This element has two attributes: xpath, which records the path in the input model along which a model entity is accessed, and startNode, which records the input-model element on which the path is executed.

Figure 5A:
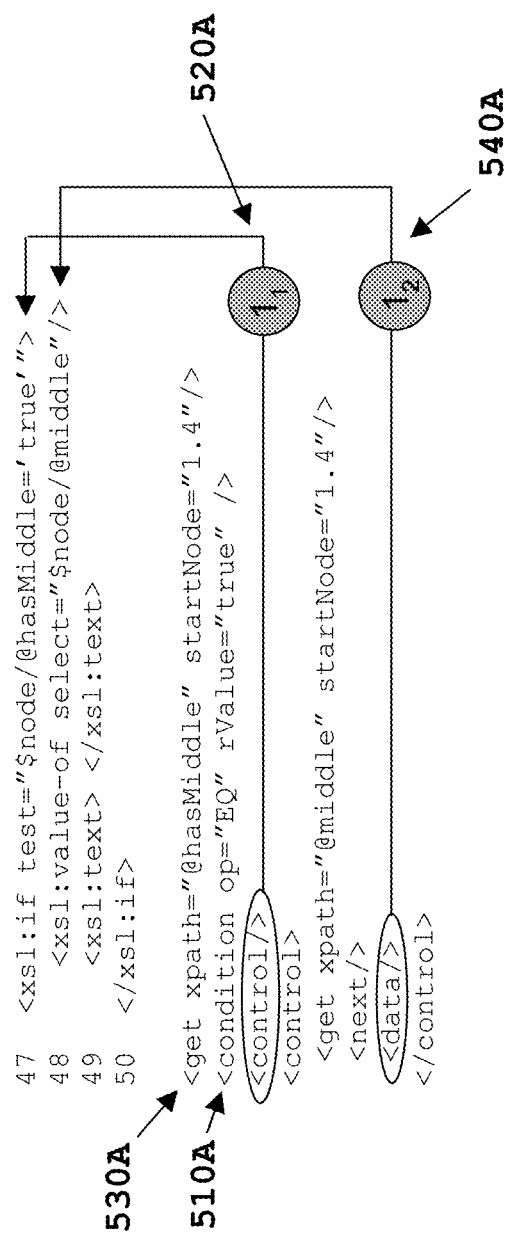

FIG. 5A shows the metadata collected at line 47 of PrintUser (FIG. 2(A-B)) when executed on the faulty input. The xpath attribute of the <get> element indicates the access of hasMiddle. The xpath attribute can capture a general XPath expression. For XSLT-based transforms, this expression is readily available during the transform execution. The start-Node attribute of <get> indicates that the hasMiddle is being accessed on element 1.4. Thus, although hasMiddle for the second <user> element is missing, the collected information indicates that the attribute was attempted to be accessed at line 47 (FIG. 2(A-B)).

Metadata about Conditional Statements.

For a conditional statement (that is, an if or a case statement), embodiments collect information about the comparison that occurs at the statement: the left-hand and right-hand expressions (which could represent an input-model entity or a string literal), and the comparison operator. For example, for line 47 of PrintUser, (from FIG. 2(A-B)), embodiments collect information that attribute hasMiddle (for a particular <user> element) is compared to "true" using the equality operator.

In the taint log, the information is represented in a <condition> element 510A, with attributes: (1) leftNode and lvalue to capture the left-hand expression, (2) op to capture the comparison operator, and (3) rightNode and rvalue to capture the right-hand expression. If an expression is a string literal, the node attribute does not occur. If the accessed input-model attribute does not exist, neither the node attribute nor the value attribute exist. The <condition> element 510A in the taint-log fragment for line 47, shown in FIG. 5A, illustrates this. In this case, <condition> 510A is missing leftNode and lvalue attributes because the accessed attribute hasMiddle does not exist in the input model.

Metadata about Selection in Loops.

Transforms often select specific elements from a collection of elements based on some selection criteria. For such statements, embodiments collect data about the input-model elements being iterated over and the selection criterion being applied to each element. The taint log in FIG. 5B illustrates the metadata collected at lines 20-21 (from FIG. 2(A-B)).

The <get> sub-element 510B of the <loop> element 520B (which contains information about loop taints) records the selection criterion (an XPath expression) in the <xpath> attribute. The XPath captures the fact that the type attribute of the <relationship> element is compared, using the equality operator, to string "wife."

Fault-Index Analysis

The fault-index analysis uses the metadata associated with the fault index to compute repair actions. Consider the taint-log fragment shown in FIG. 5A, in which the fault index for failure E1 (FIG. 2D) is highlighted as $I_1$ 520A. The fault index is an empty control taint, which is preceded by a <condition> 510A element. This control taint is propagated during the execution of line 47 of the transform on the faulty input.

Thus, the empty control taint indicates that the fault E1 caused the conditional in line 47 of PrintUser to evaluate false. The metadata associated with the <condition> element 510A lets embodiments reconstruct the expected evaluation as leftNode=true. However, the leftNode attribute is not present in the taint log, suggesting that the input-model entity that was accessed as leftNode did not exist. Next, the <get> element 530A preceding the <condition> element 510A provides information that attribute hasMiddle was accessed on input-model element 1.4. Putting together all this information, embodiments compute the following repair actions:

| ADD | hasMiddle TO 1.4 | [r$_1$ (E1)] |
|---|---|---|
| SET | hasMiddle TO true | [r$_2$ (E1)] |

FIG. 5B illustrates the fault index for E2 (FIG. 2D), highlighted by the ellipse. Similar to E1, the fault index is an empty control taint. The control taint 530B is preceded by a <next> element 540B whose parent element is a <loop> element 520B. This indicates that the fault causes a loop iteration to not occur. The metadata associated with the <get> sub-element 510B of <loop> 520B captures the criterion that was used to select the elements to be iterated over.

Thus, starting at element 1.4, the transform expected the path family/user/relationship to exist in the input such that the type attribute of <relationship> was wife. Moreover, embodiments are able to resolve the access of <relationship> to ID 1.4.2.2.2 (see line 21 in FIG. 2C, this resolution process is further described herein). Thus, the fault-index analysis issues two repair actions:

| ADD | type TO 1.4.2.2.2 | [$r_1$ (E2)] |
| SET | htype TO wife | [$r_2$ (E2)] |

FIG. 5C illustrates the fault index for E3 (FIG. 2D). In this case, the problem is traced to a missing loop iteration 510C, which occurs because the selection criterion is not satisfied. Following a similar approach as for E2, the analysis computes four repair actions:

| ADD | user TO 1.4.2 | [$r_1$ (E3)] |
| ADD | relationship TO user | [$r_2$ (E3)] |
| ADD | type TO relationship | [$r_3$ (E3)] |
| SET | type TO dependent | [$r_4$ (E3)] |

The example repair actions computed by the fault-index analysis target fixing the immediate cause of the failure. However, some faults can require multiple fixes in the input model. For such faults, the repair actions computed by fault-index analysis fix the model only partially. In the example, both E1 and E3 illustrate partial fixes. For E1, after repair actions $r_1$ (E1) and $r_2$ (E1) are applied and the transform is rerun, the desired output (the middle name for user "Amit Doe2") is still not generated. Although the repair actions fixed attribute has-Middle, attribute middle was still missing in the fixed model. On this execution, the fault index is the empty data taint marked $I_2$ 540A in FIG. 5A. The fault-index analyzer computes the following additional repair actions for E1:

| ADD | middle TO 1.4 | [$r_3$ (E1)] |
| SET | middle TO * | [$r_4$ (E1)] |

In this manner, the user could iteratively perform fault localization and repair and, in each iteration, fix the model partially based on the repair actions computed by the fault-index analysis, until the fix is complete. Clearly, such an approach can be cumbersome. Thus, embodiments utilize a pattern-analysis technique that addresses this situation by identifying a set of possible repair actions that may be required to generate the correct output.

Pattern Analysis

Figure 6:
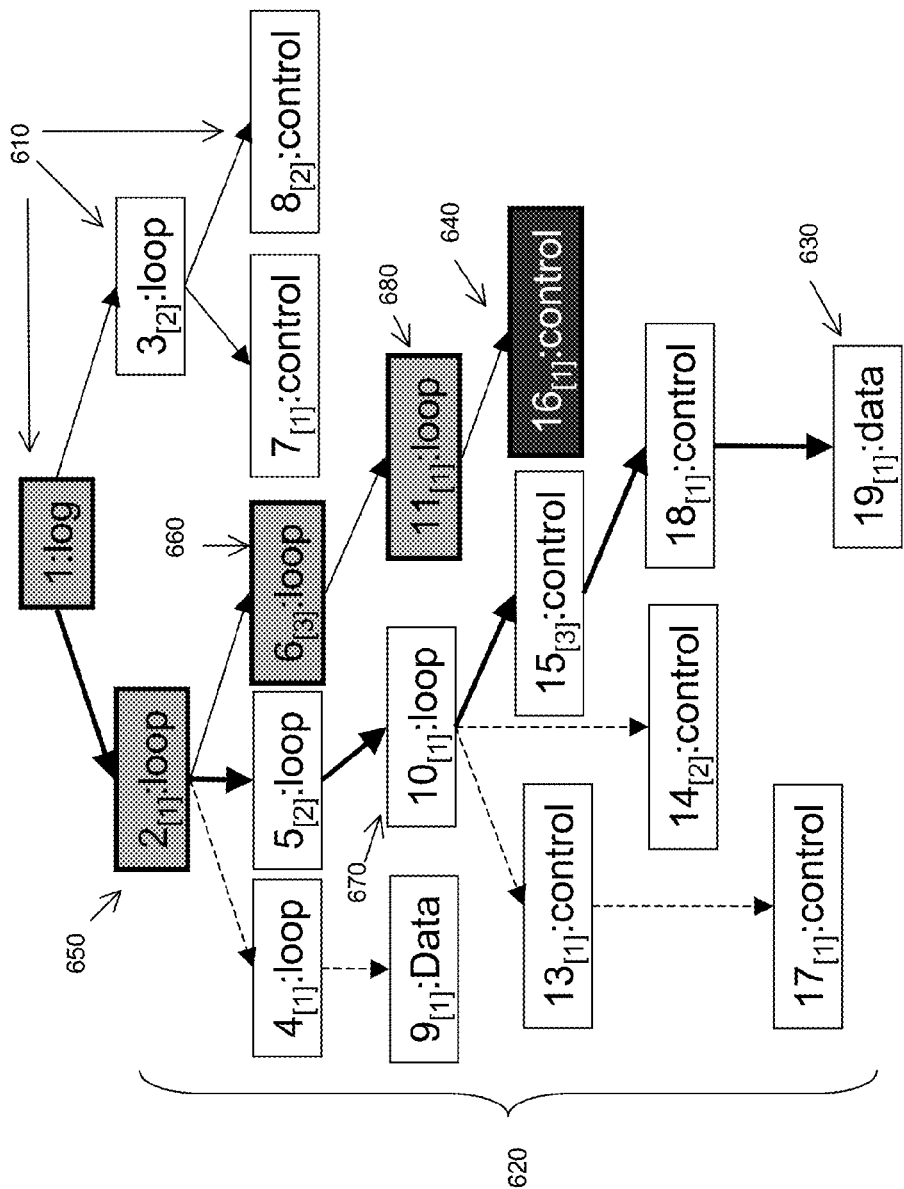
FIG. 6 illustrates an example of pattern analysis processing.

Embodiments employing pattern analysis find output string fragments that are similar to the incorrect string fragment. Embodiments do this based on the structure of taint marks in the taint log. Intuitively, the taint marks in the log have a hierarchical, tree-like structure. FIG. 6 presents an illustrative example.

Each taint mark in the log is represented as a node 610. The edges in the tree represent the nesting among the taint marks. The sibling nodes 620 are ordered, from left to right, based on their sequence of occurrence in the log. Thus, each node 610 has an index associated with it, which specifies the position of the node 610 among its siblings 620. In the figure, the index of a node 610 is specified as a subscript [x]. A loop taint has a control-taint child per iteration of the loop, and one control-taint child for the last loop condition evaluation (after which execution exits the loop). In addition to the three types of taints, nodes also represent string literals, which have no taints associated with them. A data or a literal node can occur only as a leaf node 630.

The fault index of a taint log maps to a taint node in the taint log tree. For example, in FIG. 6, node $16_{[1]}$ 640 is the fault index. Intuitively, starting at the fault index 640, the pattern analysis traverses up in the tree to identify the (unique) path to the root, which is referred to as the fault path. This path is highlighted in FIG. 6. Next, the analysis traverses down in the tree, in a depth-first manner guided by the fault path, to find a matching path that is at least as long as the fault path and that ends at a data node. The fault path guides the downward traversal in the following manner. If a loop node 650 is encountered, the traversal explores each child of the node 650 (except the child that occurs in the fault path, in this example node 660). At any non-loop node, the traversal continues at the child node (for example, node 670) whose index matches the index of the corresponding node (that is, the node 680 at the same depth) in the fault path.

As an example, for the fault path $(1, 2_{[1]}, 6_{[3]}, 11_{[1]}, 16_{[1]})$, the process traverses node $2_{[1]}$, it does not traverse $3_{[2]}$ because its index, 2, does not match the index, 1, of the fault node 640. Because $2_{[1]}$ is a loop node 650, the analysis explores all its child nodes except for $6_{[3]}$ (node 660) because it occurs on the fault path. The analysis traverses four paths, which are emphasized with thick lines in the figure. Of these, the sub-paths in dotted lines illustrate the traversals along which the analysis finds no relevant paths for computing repair actions. For example, path $(1, 2_{[1]}, 4_{[1]}, 9_{[1]})$ is irrelevant because its length is less than the length of the fault path. Path $(1, 2_{[1]}, 5_{[2]}, 10_{[1]}, 14_{[2]})$ is irrelevant because it does not end at a data or string literal node; Path $(1, 2_{[1]}, 5_{[2]}, 10_{[1]}, 13_{[1]}, 17_{[1]})$ is also irrelevant for the same reason. Thus, the highlighted path $(1, 2_{[1]}, 5_{[2]}, 10_{[1]}, 15_{[3]}, 18_{[1]}, 19_{[1]})$, is the only matching path.

The search for matching paths is guided by the fault path to ensure that a similar string is explored by the pattern analysis. The constraints on the path length (that is, the path must be at least as long as the fault path) and on the last node (that is, the node must be a data (leaf) node), ensure that the repair actions computed based on a matching path will lead to a change in the output text at the error marker. The repair actions are generated based on the metadata associated with the taints that are encountered starting at the node where the length of the matching path is equal to the length of the fault path.

To illustrate the pattern analysis, consider the taint log shown in FIG. 5C, which is used to compute repair actions for E3 (of FIG. 2D). The paths are illustrated using the line numbers in the log. The fault path in the log is (1, 2, 26, 28, 31, 35). To find a similar output instance, the process traverses the matching path (1, 2, 5, 7, 10, 14, 17). In the matching path, it skips the first six nodes, because the length of the fault path is six, and then repair actions are computed based on the metadata information associated with node 17 (that is, at lines 15 and 16). This part of the taint log is highlighted with a bounding box 520C. The <next> element at line 16 indicates that attribute first of 1.2.2.4 is printed. Generalizing the metadata information to model entity types, embodiments identify that attribute first is required for model entity of type user (1.2.2.4 is a model entity of type user). Therefore, the pattern analysis suggests the following additional repair actions for E3:

| ADD | first TO user | [$r_5$ (E3)] |
| SET | first TO * | [$r_6$ (E3)] |

Combined with the four repairs actions $r_{1-4}$ (E3) computed by the fault-index analysis, embodiments thus compute a recommendation with six repair actions. In general, for each matching path, an alternative recommendation is computed.

Computing Repair Actions

FIG. 7 illustrates an example process for computing repair actions. The fault-index and pattern analyses compute repair actions starting at a taint mark t. In the case of fault-index analysis, t is the fault index, whereas in the case of pattern analysis, t is a taint encountered during the traversal of a matching path in the taint tree-structure. Both these analyses leverage a common process that computes repairs actions for a given taint mark. The process can be described as generally including three steps, as follows.

The first step computes intermediate repair actions. An intermediate repair action can contain an XPath expression. For example, for E2 (FIG. 2D), the intermediate repair actions corresponding to $r_1$ (E2) and $r_2$ (E2) are computed as:

ADD family/user/relationship/@type=wife TO 1.4

The "@" symbol in an XPath expression represents access a node attribute

FIG. 7 presents an example process that, given a taint mark t, computes repair actions for t. For a data taint, the process checks whether a preceding <next> element with a node attribute exists; if it does, the created repair action suggests a change in the value of the named attribute (lines 1-3). If no such element exists, the process looks for a preceding <get> element (line 4), which captures information about access of a missing entity; in this case, the process computes two repair actions to suggest the addition of the missing entity with some value (lines 5-6).

For a missing loop iteration (lines 8-10), a similar repair action is generated by accessing information about the loop selection criterion (captured in a <get> element). For a <condition> element, if leftNode and rvalue exist, a repair action is generated that sets leftNode to either rvalue or the negation of rvalue depending on the comparison operator (lines 12-13). Finally, if leftNode does not exist (indicating a comparison with a missing entity) and rvalue exists, appropriate ADD and SET actions are created (lines 14-17).

The intermediate repair actions can contain complex XPath expressions, parts of which may already exist in the input model; in the second step, embodiments refine the intermediate repair actions based on such existing parts. This step executes each XPath on the input model to identify parts that already exist in the input. For the non-matching/non-existent XPath parts, embodiments generate repair actions.

To illustrate, consider the intermediate repair action for E2 (FIG. 2D), which has the complex XPath family/user/relationship/@type. Any of the direct or indirect sub-elements of 1.4 (<family>, <user>, <relationship>) or the attribute type of <relationship> could be missing. Embodiments execute this XPath on the input model, starting at 1.4. This returns node 1.4.2.2.2, up to which the match has occurred, but beyond that type is missing. Thus, embodiments generate the repair actions $r_1$ (E2) and $r_2$ (E2), which suggest that a type attribute be added to 1.4.2.2.2 and its value be set to wife.

In the last step, after all the recommendations have been computed, embodiments can prune the recommendation set to filter out duplicate recommendations and invalid recommendations. Two recommendations are equal if they consist of the same set of actions. An invalid recommendation is one whose application can alter the output prior to the error marker. The goal of fault repair is to fix the input in such a way that the output at the error marker changes to the expected output; all text preceding the error marker is assumed to be correct. Therefore, embodiments classify a recommendation as invalid if it can potentially change any output text that precedes the error marker.

To illustrate, consider the scenario in which the fault for E2 (FIG. 2D) has been fixed: that is, an appropriate type attribute has been added to line 21 of the input (FIG. 2C). In this case, the analysis can recommend two sets of repair actions for E3. One of them requires the addition of a new (dependent) <user> sub-element to the <family> element in line 18 of the input. The second one suggests modifying the <user> element in line 19 as follows:

| SET | 1.4.2.2.type | TO dependent |

However, because 1.4.2.2.type is used to generate "Spouse Details," applying this repair action would change the part of output that is assumed to be correct. Therefore, this recommendation is classified as invalid and filtered out.

Figure 8:
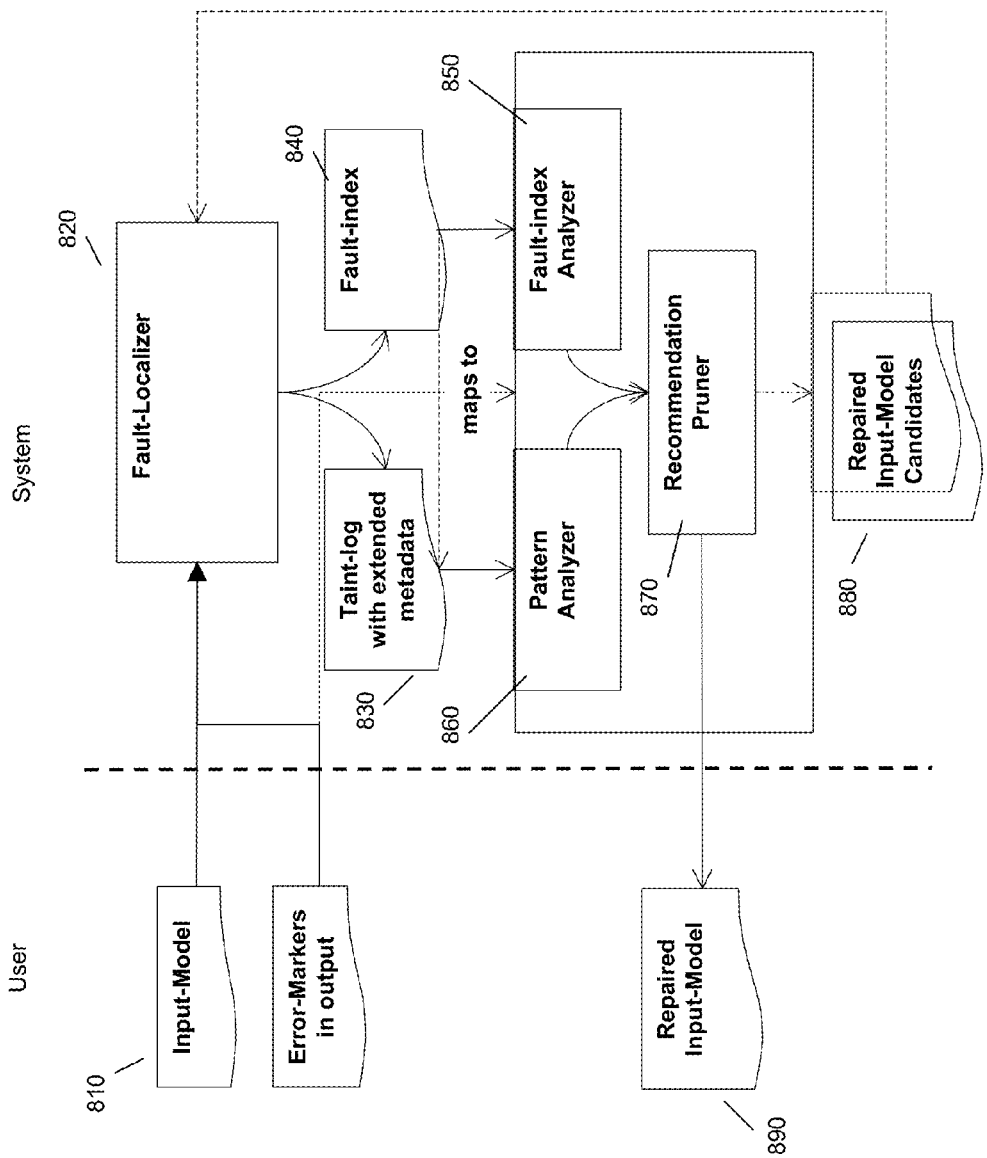
FIG. 8 illustrates an example system for automated repair support.

Turning to FIG. 8, an example system and flow for automated fault repair support are illustrated. A user inputs a model 810 to the system for fault localization using a fault localizer 820, as described herein. Taint marks are also put into the model for tracking purposes. The fault localizer 820 produces a taint log 830 and fault-index 840. The fault index 840 maps to the taint log 830.

The fault index 840 is input to a fault index analyzer 850. The fault index analyzer 850 uses the metadata associated with a fault index to compute repair actions, as described herein. The taint log is input to a pattern analyzer 860 for pattern analysis, as described herein. The pattern analyzer 860 detects similar (peer level) correct execution points in the tree of the taint log 830 and input model 810 to compute a set of repair actions.

The repair actions produced by the fault-index analyzer 850 and/or the pattern analyzer 860 are input to a recommendation pruner module 870, which filters out invalid, redundant or otherwise unsatisfactory repair action recommendations. For example, the pruner module 870 removes duplicate and/or invalid (for example, repair actions that could lead to output modifications prior to error markers in the output) repair actions.

Once pruned, a set of repaired input model candidates 880 can be presented to a user for selection of an appropriate repair action or set of repair actions. Alternatively, the system can select a repair action by default. Once repair action(s) is/are selected, a repaired input model 890 is produced.

Figure 9:
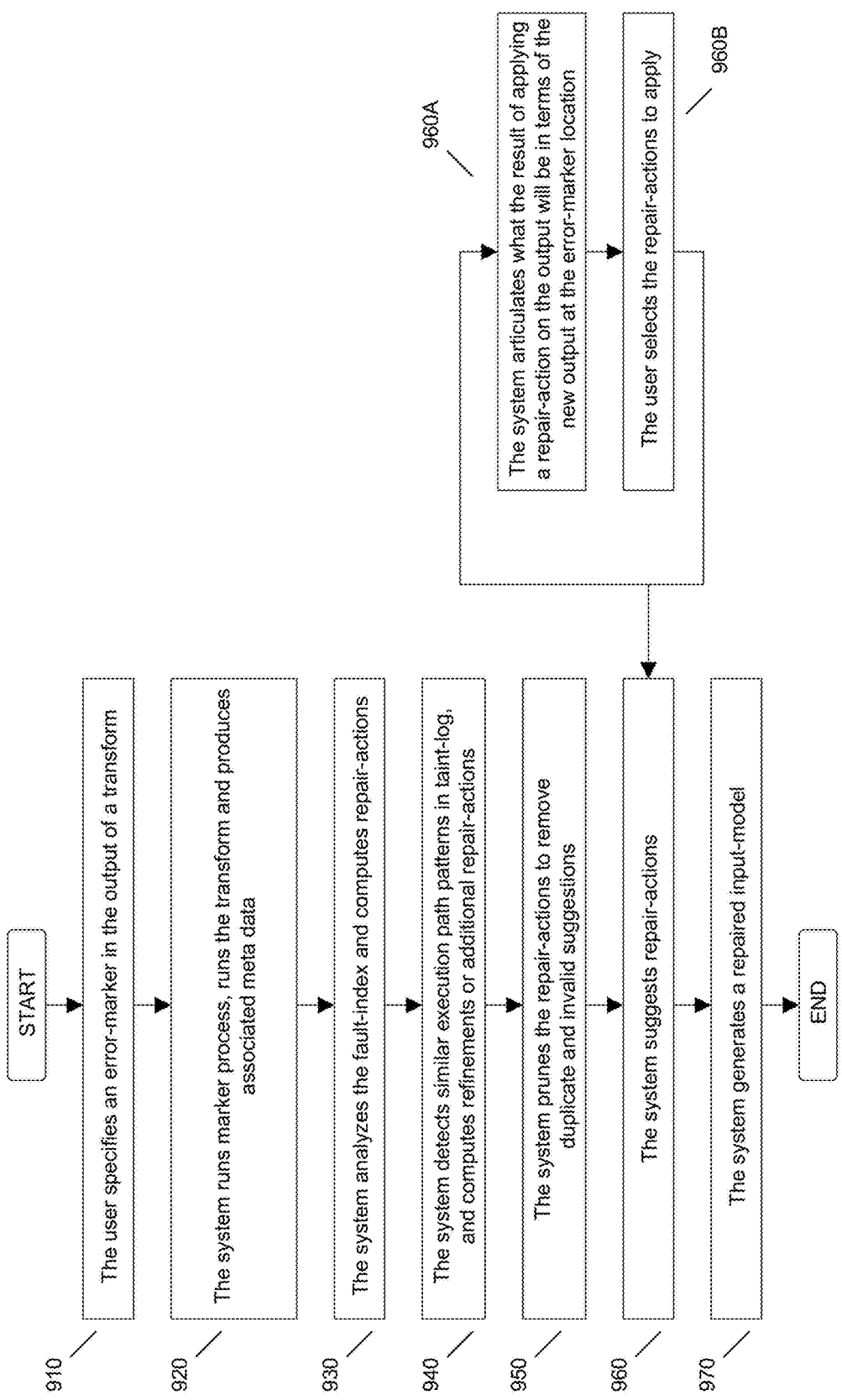
FIG. 9 illustrates an example method for automated repair support.

FIG. 9 illustrates an example method for automated fault repair support. A user can specify 910 an error marker in the output of a transform. The system then runs 920 a marking process (which could be for example an external tainting system). This marking process associates taint marks with input model elements, instruments the transform to propagate the markers via data and control dependence, and produces a taint log along with extended metadata and a fault index, as for use in providing repair action recommendations, as described herein.

The system then analyzes the fault index 930 and computes repair actions. Moreover, the system can conduct pattern analysis by detecting similar execution path patterns 940 and computing refinements or additional repair actions. The system then prunes 950 the repair action recommendations to remove undesirable repair action recommendations, such as duplicates.

The system outputs 960 suggestions for repair actions to a user. As part of this process, the system can articulate 960A what the result of applying a particular repair action(s) would be on the model (for example, what the new output would be in terms of new output at the error marker location). After the user reviews the articulation, the user can select 960B an appropriate repair action. The system then generates a repaired input model 970.

It should be noted that although example embodiments have been illustrated with an approach using XSLT-based transforms, other embodiments are applicable more generally to other transform implementations, for example in Java. For such implementations, the runtime metadata would need to be collected appropriately to generate the taint log. For example, collecting the metadata for loop selections, which is fairly straightforward for XSLT transforms, would require analysis to identify the code that performs the selection. Similarly, identifying the metadata for conditionals would require code analysis and appropriate instrumentation. However, the fault-index and pattern analyses, which operate on the taint log, remain unchanged.

The pattern analysis computes repair actions based on instances of correct strings that are similar to the incorrect string. It presumes that all matching paths identified in the taint tree-structure generate correct strings. Embodiments also assume that all output before the error marker is correct and, if there are multiple faults, the user identifies the error markers in order from the beginning of the output. With these assumptions, the pattern analysis could compute repair actions based on only those strings that precede the error marker; alternatively, it could rank lower the repair actions that are computed based on strings that follow the error marker.

Figure 10:
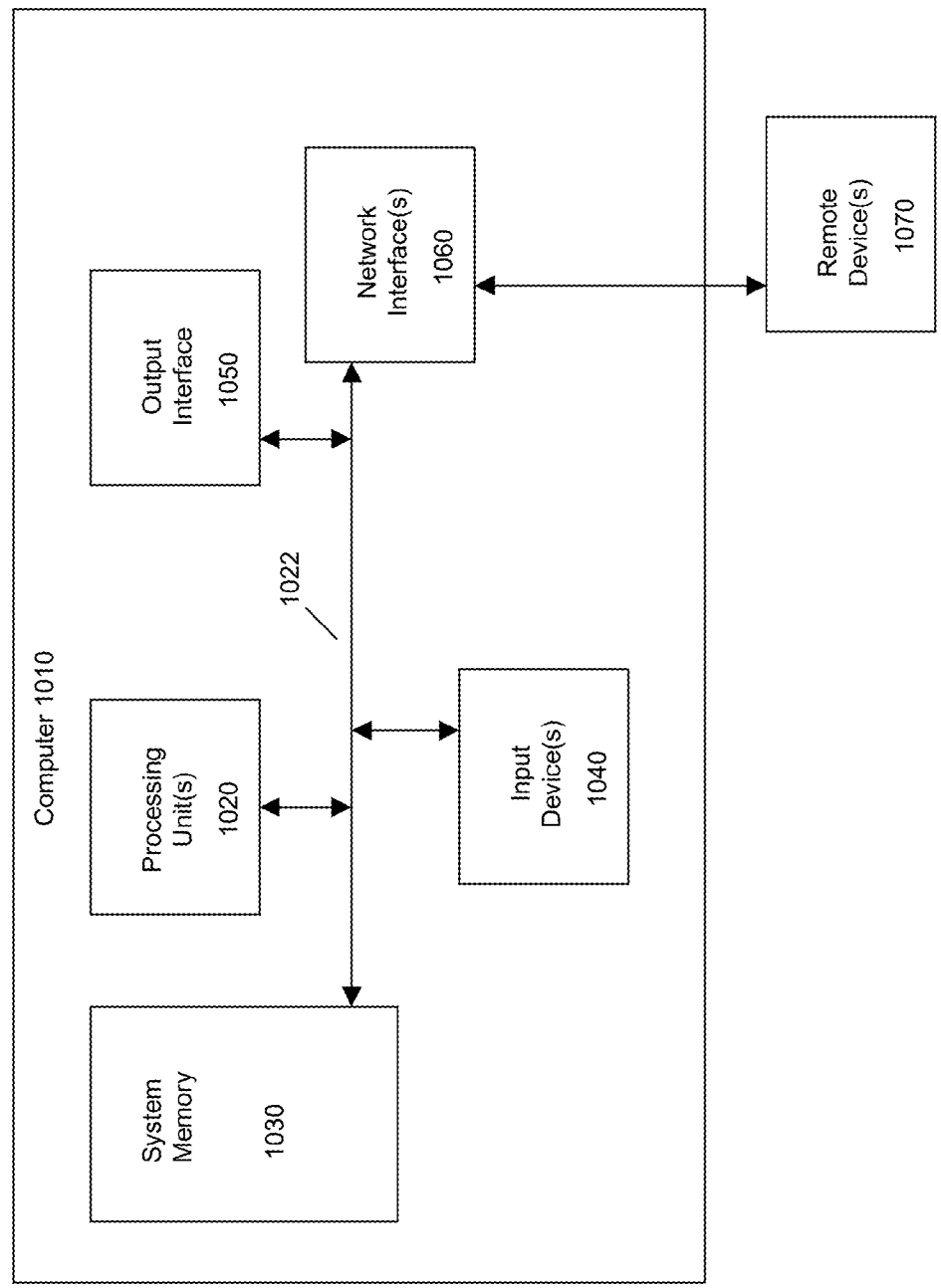
FIG. 10 illustrates an example computer system.

Referring to FIG. 10, it will be readily understood that certain embodiments can be implemented using any of a wide variety of devices or combinations of devices. An example device that may be used in implementing one or more embodiments includes a computing device in the form of a computer 1010. In this regard, the computer 1010 may execute program instructions configured to access an input model, run transformations, localize faults, ascertain one or more repair actions, and perform other functionality of the embodiments, as described herein.

Components of computer 1010 may include, but are not limited to, a processing unit 1020, a system memory 1030, and a system bus 1022 that couples various system components including the system memory 1030 to the processing unit 1020. The computer 1010 may include or have access to a variety of computer readable media. The system memory 1030 may include computer readable storage media in the form of volatile and/or nonvolatile memory such as read only memory (ROM) and/or random access memory (RAM). By way of example, and not limitation, system memory 1030 may also include an operating system, application programs, other program modules, and program data.

A user can interface with (for example, enter commands and information) the computer 1010 through input devices 1040. A monitor or other type of device can also be connected to the system bus 1022 via an interface, such as an output interface 1050. In addition to a monitor, computers may also include other peripheral output devices. The computer 1010 may operate in a networked or distributed environment using logical connections to one or more other remote computers or databases. The logical connections may include a network, such local area network (LAN) or a wide area network (WAN), but may also include other networks/buses.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any combination of one or more programming languages, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method for automated repair support for input model errors comprising:
    utilizing a processor to execute computer code configured to perform the steps of:
    accessing an input model;
    transforming the input model to produce an output;
    accessing input indicating one or more errors within the output;
    said transforming comprising propagating at least one taint mark to the output and generating a taint log;
    creating a fault index, associated with the taint log, for the one or more errors, the fault index relating the one or more errors to the at least one taint mark;
    using the fault index to compile one or more repair action suggestions to repair the one or more errors; and
    outputting the one or more repair action suggestions.

2. The method according to claim 1, wherein to compile one or more repair action suggestions to repair the one or more errors further comprises conducting a fault index analysis to identify one or more repair action suggestions.

3. The method according to claim 1, wherein to compile one or more repair action suggestions to repair the one or more errors further comprises conducting a pattern analysis to identify one or more repair action suggestions.

4. The method according to claim 3, wherein conducting a pattern analysis to identify one or more repair action suggestions further comprises clustering elements of the output corresponding to execution paths into one or more equivalence classes based on structure within the taint log.

5. The method according to claim 4, wherein conducting a pattern analysis to identify one or more repair action suggestions further comprises utilizing the elements clustered to identify the one or more repair action suggestions.

6. The method according to claim 1, further comprising pruning the one or more repair action suggestions.

7. The method according to claim 6, wherein pruning the one or more repair action suggestions further comprises removing one or more of a duplicate repair action suggestion and an invalid repair action suggestion.

8. The method according to claim 7, wherein pruning the one or more repair action suggestions further comprises:
    executing a modification of the input model using the one or more repair action suggestions; and
    comparing one or more additional outputs of said transform with the output.

9. The method according to claim 1, further comprising generating an indication of an impact a selected repair action suggestion would have on the input model if implemented.

10. The method according to claim 1, further comprising applying the one or more repair action suggestions to modify the input model.

11. The method according to claim 1, further comprising applying the one or more repair action suggestions to modify the input model responsive to a user selection of a repair action suggestion.

12. The method according to claim 1, wherein the fault index further corresponds to an error marker in the output.

13. The method according to claim 12, wherein the fault index further includes metadata, and wherein the metadata of the fault index comprises runtime information corresponding to one or more of: entities being accessed, and boolean expressions associated with one or more statements in a transform.

14. The method according to claim 1, wherein the one or more repair action suggestions further comprise one or more of: addition of an element to the input model; addition of an attribute to an element of the input model; and a modification of an attribute of an element of the input model.

15. A computer program product for automated repair support for input model errors comprising:
    a computer readable storage medium having computer readable program code embodied therewith, the computer readable program code comprising:
    computer readable program code configured to access an input model;
    computer readable program code configured to transform the input model to produce an output;
    computer readable program code configured to access input indicating one or more errors in the output;
    computer readable program code configured to transform the input model via propagating at least one taint mark the output and generating a taint log;
    computer readable program code configured to create a fault index, associated with the taint log, for the one or more errors, the fault index relating the one or more errors to the at least one taint mark;
    computer readable program code configured to use the fault index to compile one or more repair action suggestions to repair the one or more errors; and
    computer readable program code configured to output the one or more repair action suggestions.

16. The computer program product according to claim 15, further comprising computer readable program code configured to generate an indication of an impact a selected repair action suggestion would have on the input model if implemented.

17. The computer program product according to claim 15, further comprising computer readable program code configured to apply the one or more repair action suggestions to modify the input model.

18. The computer program product according to claim 15, further comprising further comprising computer readable program code configured to apply the one or more repair action suggestions to modify the input model responsive to a user selection of a repair action suggestion.

19. The computer program product according to claim 15, wherein the one or more repair action suggestions further comprise one or more of: addition of an element to the input model; addition of an attribute to an element of the input model; and a modification of an attribute of an element of the input model.

20. A system for automated repair support for input model errors comprising:
- one or more processors; and
- a memory operatively connected to the one or more processors;
- wherein, responsive to execution of computer readable program code accessible to the one or more processors, the one or more processors are configured to:
- access an input model;
- transform the input model to produce an output;
- access input indicating one or more errors in the output;
- wherein to transform comprises transforming the input model via propagating at least one taint mark to the output and generating a taint log;
- create a fault index, associated with the taint log, for the one or more errors, the fault index relating the one or more errors to the at least one taint mark;
- use the fault index to compile one or more repair action suggestions to repair the one or more errors; and
- output the one or more repair action suggestions.

* * * * *